United States Patent [19]

Mills et al.

[11] E Patent Number: Re. 32,971

[45] Reissued Date of Patent: Jul. 4, 1989

[54] ENVELOPE ASSEMBLY

[75] Inventors: Larry E. Mills, West Chester; Thomas D. Dove, Cincinnati, both of Ohio

[73] Assignee: Bedinghaus Business Forms, Inc., Cincinnati, Ohio

[21] Appl. No.: 836,006

[22] Filed: Mar. 4, 1986

Related U.S. Patent Documents

Reissue of:

[64] Patent No.: 4,435,001
Issued: Mar. 6, 1984
Appl. No.: 357,378
Filed: Mar. 12, 1982

[51] Int. Cl.[4] ..... B41L 1/26

[52] U.S. Cl. ..... 282/11.5 A; 229/69

[58] Field of Search ..... 229/69, 73, 80; 282/11.5 R, 11.5 A; 53/450; 283/1 B

[56] References Cited

U.S. PATENT DOCUMENTS

| | | | |
|---|---|---|---|
| 3,554,438 | 1/1971 | Malderghem | 282/11.5 A X |
| 3,584,438 | 1/1971 | Malderghem | 282/11.5 A |
| 3,941,307 | 3/1976 | Malderghem | 229/69 |
| 3,941,309 | 3/1976 | Gendron | 282/1 B |
| 4,051,995 | 10/1977 | Wieman | 282/11.5 A X |
| 4,178,018 | 12/1979 | Halse | 282/11.5 A |
| 4,236,731 | 12/1980 | Hektoen | 282/11.5 A |
| 4,313,557 | 2/1982 | Foffel | 282/1 B |
| 4,334,618 | 7/1982 | Buescher | 282/1 B |
| 4,645,123 | 2/1987 | Ashby | 229/69 |

*Primary Examiner*—Paul A. Bell
*Attorney, Agent, or Firm*—Wood, Herron & Evans

[57] ABSTRACT

An envelope assembly is provided which includes an outside envelope housing and an insert assembly which may include a return envelope and/or an information ply or plies. The outside envelope is sealed by a line of interconnection around its periphery. The return envelope is sealed on three peripheral sides and has an open edge for use when removed from the outside envelope. The return envelope can be filled and closed. The information ply is attached to the return envelope and remains attached when the outside envelope is opened and the contents removed. The return envelope and the attached information ply is fixed at its inner and outer edges while housed in the closed outside envelope. In this manner, registration is maintained between the outside envelope, the return envelope and the information ply during formation and while indicia is placed thereon.

11 Claims, 5 Drawing Sheets

ENVELOPE ASSEMBLY

Matter enclosed in heavy brackets [ ] appears in the original patent but forms no part of this reissue specification; matter printed in italics indicates the additions made by reissue.

BACKGROUND OF THE INVENTION

The field of commercial business forms has shown continuous and rapid growth in recent years. This is particularly true in regard to forms used in mail correspondence. Commercially, this type of business form includes an outside envelope, one or more sheets of material within the envelope bearing information for the recipient such as billing invoices, data read-outs, and similar information. In many instances return materials are solicited from the recipient such as orders, payments and responses to request for information in general. For this purpose, it is desirable to enclose a return envelope. In this manner, a prompt response is encouraged with the convenience of the recipient in mind.

Naturally there is considerable difficulty in inexpensively and efficiently mass producing the envelope package. This is particularly true when consideration is given to the fact that all of the materials vary in size and generally contain a variety of different types of information. Thus, the components, such as the outside envelope, the return envelope, and any enclosed information bearing sheets must be formed, assembled and imprinted with general and personal information directed to individual recipients. Thus, maintaining registration between components is a concern.

Also, often the contents are put aside for awhile and papers become separated and some lost or misplaced. In opening the envelope and removing the contents sometimes some insert papers, such as a return envelope, are inadvertently overlooked and left in the outside envelope which is provided. This presents a further problem. The mailing received by the recipient should be easy to open and the contents easily removed.

Throughout the years, a variety of different systems have been devised for forming the envelope assembly. In general, the preferred method in regard to cost, efficiency, and quality of the resultant product involves forming the combination of outside envelopes, return envelopes and information sheets as a continuous serial web of assemblies which are easily detachable for individually mailing to recipients. With all the available high speed automated equipment, it is extremely important to maintain close control of the various sheets during the formation process. This is particularly true when indicia and information in general is placed on the various sheets. Registration between the sheets is extremely important so that the indicia is placed in the proper location.

With the advent of automated machines, rapid technological development has been made in envelope design and construction. One early development involved a continuous series of sealed, stuffed envelopes with the contents contained therein. Tear strips were provided on all four sides of the envelope and all of them were required to be removed in order for the contents to be extracted.

Another early approach involved in a single envelope construction with a possible insert enclosed. One sheet of paper was always folded and by means of the folds the internal envelope or insert sheet, but not both, would be placed inside the outer envelope. One tear strip was provided to hold the inner envelope in place and allow for its removal when torn. However, the construction involved strictly folds and did not employ pasted plies and clearly could not be adapted for continuous strip mass production.

U.S. Pat. No. 3,104,799 to Steidinger was an improvement to the above ideas and involved an assembly for a series of sealed stuffed envelopes. Steidinger utilized continuous form stationary assemblies of individually sealed envelopes, each containing inserts which are imprinted by means of spot carbons while enclosed in the sealed envelope, and manufactured from superimposed ply strips. The top ply comprises the business record and the underlying plies form the envelopes and their contents.

In the Steidinger assembly, the envelopes have a single tear strip, usually located on the left edge, by which the recipient opens the envelope. A thumb tab indentation allows him to remove the contents easily. Before being opened, these same tear strips anchor the contents of the envelope in place so that all forms are lined up in proper registration for printing. This single tear strip arrangement is accomplished in Steidinger by pre-cutting the insert strip in spaces corresponding to the top and bottom of the outer envelope, creating an insert web structure which allows the outer envelope to be glued together, while permitting up to three margins of the insert to be freed for easy opening. This approach solved difficulties encountered when dealing with prior developments which had clear shortcomings. For example, one such concept utilized a series connected envelope and check with spot carbons to imprint both a master and internal sheets as well as portions of an outer envelope. The envelope was positioned in a pocket on the underside of the assembly and required hand stuffing and sealing.

Many additional improvements have been made as the return mailing concept gained acceptance and its scope of use increases in the world.

U.S. Pat. Nos. 3,237,970; 3,437,259; 3,554,438; 3,854,654; 3,941,307; 3,941,308; and 3,981,435 relate to a series of improvements in the Steidinger type envelope generally including a serially arranged plurality of envelope assemblies with line holes in the control margins of the outer envelope.

U.S. Pat. Nos. 3,315,984 and 3,790,070 show the concept of a snap-out business form or insert.

U.S. Pat. Nos. 3,339,827; 3,411,699; and 3,777,971 deal with the concept of placing the insert in the pocket of an outer envelope. This shows the diversity of the development of the art as does U.S. Pat. No. 3,837,565 dealing with manifold type stuffed mailers.

Finally, with the computerization of many technologies, it is inevitable that computer printing should be utilized in the types of business envelope assemblies under consideration. Examples of recent development in this area are present in U.S. Pat. Nos. 3,820,447; 4,000,916; and 4,113,281.

It is clear that the field of development is quite active and further improvements are warranted and desired.

SUMMARY OF THE INVENTION

With the above background in mind, it is among the primary objectives of the present invention to provide a continuous or serial arrangement of envelope assemblies adapted for use in commercial environments.

It is an objective to provide an envelope assembly which is easily detachable from the remaining assemblies and adapted for use as a return mailer. The envelope is designed so that it can be constructed quickly and efficiently on modern automated equipment with personalized information for each recipient imprinted on all elements of the assembly.

It is an objective to provide an envelope assembly individually formed or formed as one of a serial arrangement of detachable envelope assemblies with improved construction to maintain registration between all elements of the assembly during manufacture and the imprinting of indicia on one or more of the components thereof.

It is an objective to provide an envelope assembly with a return envelope and one or more information sheets enclosed therein, both of which are easily accessible upon opening of the outside envelope. The assembly is designed so that each insert sheet and the return envelope are held in registration with the outside envelope so that the entire assembly can be maintained in proper alignment for imprinting appropriate information on one or more of the elements of the assembly.

It is an objective to provide an envelope assembly which includes an outside envelope, a return envelope and an information sheet with the information sheet and return envelope inserted in the outside envelope and maintained in registration and retained against movement during placing of appropriate information on one or more of the outside envelope, return element and information sheet and thereafter, retained in registration until opening of the outside envelope.

It is a further objective to provide appropriate lines of weakening to facilitate opening of the outside envelope and gain access to the interior thereof and for removal of a return envelope and at least one information sheet and separation thereafter.

Appropriate lines of interconnection are provided to seal the outside envelope, hold the return envelope and information sheet in position within the outside envelope, and seal three sides of the return envelope. The fourth side of the return envelope can be closed and the envelope mailed after removal from the outside envelope. Appropriate sealing means is provided on the return envelope to seal the fourth side.

A further objective is to provide interconnection means between the return envelope and the information sheet while housed in the outside envelope so that when the outside envelope is opened and the return envelope and information sheet are removed they will be retained in interconnected relationship. In this manner the information sheet and return envelope will remain coupled and neither will become misplaced from the other. When the recipient proceeds with a response and considers the information sheet, the return envelope will be immediately available and can be easily detached from the information sheet and filled and sealed for return mailing.

A still further objective of the present invention is to provide an outside envelope with lines of interconnection substantially around its entire peripheral surface and to provide inner and outer detachable marginal edge portions on opposing marginal edges of the envelope. The marginal edge portions are detached by means of one or more lines of weakening formed, for example, by a series of perforations.

It is an objective to provide the inner marginal edge portion of the outer envelope in two parts separated by a line of weakening. One of the two parts contains a portion of the line of interconnection between rear and front envelope plies. The outer marginal edge portion of the outside envelope is also separable along a line of weakening from the remainder of the rear and front plies of the outside envelope.

The return envelope has back and forward plies smaller than the outside envelope. The back ply has inner marginal edge portions but not outer since it is short on the right side and the forward ply is provided with inner and outer marginal edge portions and the back ply has an inner marginal edge portion.

The information sheet is attached to the forward ply of the return envelope and also has inner and outer marginal edge portions.

The open side of the return envelope is at the outer edge and the outer marginal edge portion of the forward ply extends into the line of interconnection between the rear and front plies of the outside envelope. The outer marginal edge portions of the forward ply and the information sheet are interconnected along a line of interconnection and have aligned lines of weakening. The outer marginal edge portion of the forward ply of the return envelope has a third part which extends inwardly with respect to the first and second parts of its outer marginal edge portion to a third line of weakening with the third part forming a flap for sealing the open end of the return envelope. An appropriate adhesive and cover strip are provided so that removal of the cover strip will expose the adhesive on the flap and bending of the flap into overlying relationship with the rear of the back ply of the return envelope will seal the return envelope.

The outer marginal edge portion of the forward ply has a line of weakening which is weaker than the lines of weakening of the remainder of the forward ply and the outer marginal edge portion of the information sheet and the remainder of the information sheet. This provides for detachment of the interconnected return envelope and information sheet and removal from the opened outside envelope.

Opening of the outside envelope is facilitated by the provision of an arcuate portion of the line of weakening adjacent the inner marginal edge portion of each ply to provide a thumb notch so that when the inner marginal edge portion is removed along the lines of weakening, access apertures will be provided for facilitating grasping of the return envelope and information sheet contained within the outside envelope. Additionally, removal of the inner marginal edge portions of the outside envelope will also remove the inner marginal edge portions of the return envelope and information ply and thus disconnecting the return envelope and information ply at the inner edge.

The information ply and the connected return envelope can then be grasped and removed from the outside envelope by exerting sufficient force to achieve detachment at the weakest point. This is the line of weakening between the first and second parts of the outer marginal edge portion of the forward ply of the return envelope. Thereafter, outer marginal edge portions of the return envelope and information sheet can be removed by separating them along the appropriate lines of weakening. This action forces the information ply and return envelope from one another. Material can then be placed in the return envelope and the flap of the return envelope folded and sealed.

It is an objective of the invention to provide the lines of interconnection by means of an appropriate adhesive or glue and the lines of weakening by appropriate perforations. All of the elements in the envelope assembly can be formed of paper or paper products and are multisided, for example rectangular in configuration.

The envelope assembly can be individually or serially formed as a continuous web of envelope assemblies, easily detachable by means of appropriate lines of weakening formed, for example, by perforations.

In summary, an envelope assembly is provided and has an outside envelope including a rear and a front ply having inner and outer marginal edge portions separable along lines of weakening. A line of interconnection is around substantially the entire peripheral surface to seal the outside envelope. A return envelope is provided including a back ply and a forward ply smaller in size than the outside envelope so as to be received therein. The forward ply has inner and outer marginal edge portions and the back ply has an inner marginal edge portion only separable along lines of weakening. An information ply smaller than the outside envelope is provided so as to be received in the outside envelope and has inner and outer marginal edge portions separable along lines of weakening. The back and forward plies of the return envelope are fastened along a line of interconnection around the periphery thereof interrupted by an access opening. Sealing means is present to close the access opening after the return envelope has been removed from the outside envelope. The inner marginal edge portions of the back and forward plies of the return envelope and the information ply are held by the line of interconnection of the outside envelope. At least one of three outer marginal edge portions of the forward ply or the information ply is held by the line of interconnection of the outside envelope. The outer marginal edge portions of the forward ply and of the information ply are attached along a line of interconnection thereby retaining the information ply and the return envelope in attachment in the outside envelope. This fixes the inner and outer edges of the return envelope and information ply to retain the outside envelope, return envelope and information ply in registration to facilitate formation of the envelope assembly and application of indicia thereon. The outside envelope is adapted to be opened by grasping and detaching one of the inner and outer marginal edge portions thereof which will also remove marginal edge portions of the return envelope and information ply and facilitate grasping of the return envelope and information ply through the open end of the outside envelope. The line of weakening between the one ply and the marginal edge portion held by the line of interconnection of the outside envelope is weaker than the lines of weakening at the outer marginal edge portions of the other plies so that detachment of the return envelope and information ply will occur by separation of the one ply from its outer marginal edge portion and the return envelope and attached information ply can be withdrawn from the outside envelope. Detachment of the information ply is accomplished by detaching the remaining marginal edge portion thereof.

With the above objectives among others in mind, reference is made to the attached drawings.

DETAILED DESCRIPTION

Figure 1:
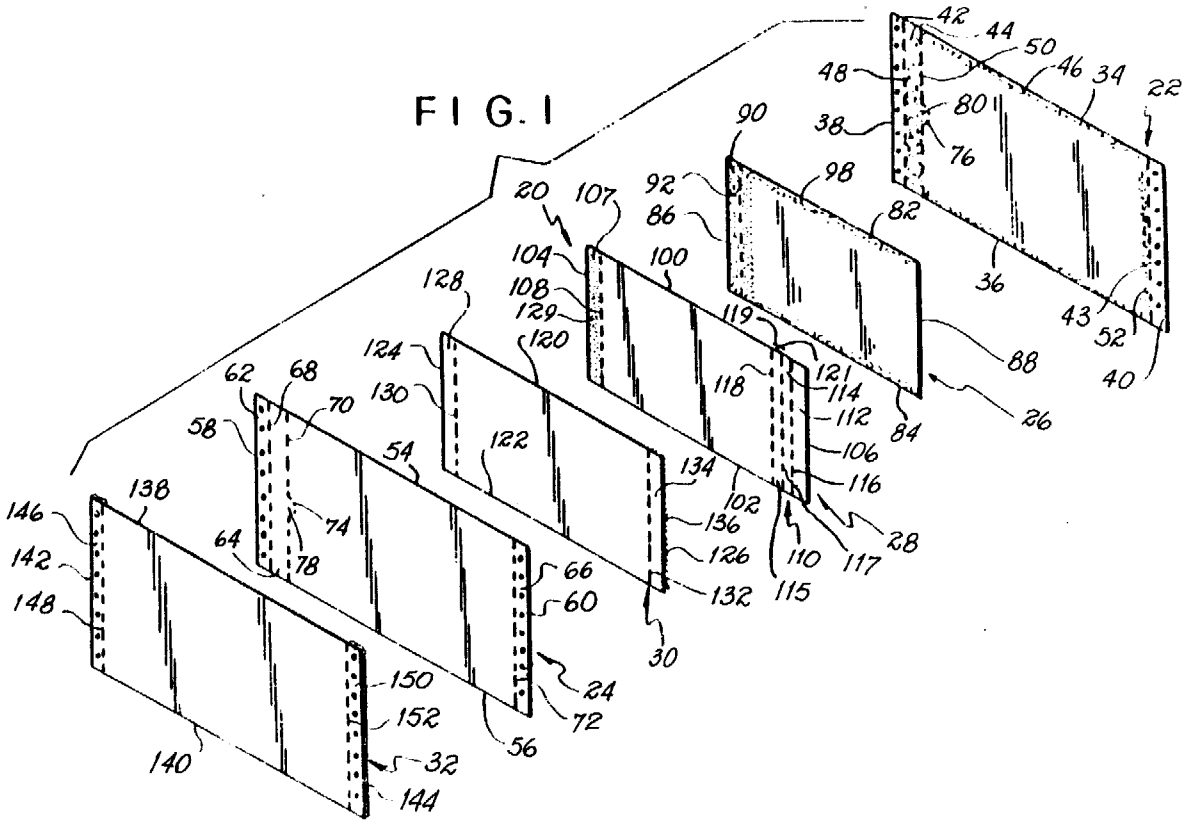
FIG. 1 is an exploded perspective view of the envelope assembly of the invention.

Envelope assembly 20, as shown in exploded form in FIG. 1, includes a plurality of rectangularly shaped elements. An acceptable element material is paper. The assembly includes an outside envelope formed of a rear ply 22 and a front ply 24. A return envelope and an information ply are captured between plies 24 and 22 of the outside envelope. The return envelope includes a back ply 26 and a forward ply 28. The information ply 30 is a single sheet.

Also shown in FIG. 1 is an inventory control sheet 32 which is initially formed with the envelope assembly 20 and is removed prior to transmittal to the recipient.

Rear ply 22 of the outside envelope includes opposing longer top edge 34 and bottom edge 36 and opposing shorter inner edge 38 and outer edge 40. Adjacent inner edge 38 is an inner marginal edge portion including a first part 42 and a second part 44. At the outer edge 40 an outer marginal edge portion 43 is provided. Common adhesive or glue is present around substantially the entire periphery of rear ply 22 to form a substantially continuous line of interconnection 46 for attachment to front ply 24.

A line of weakening 48 is positioned between first part 42 and second part 44 of the inner marginal edge portion of ply 22 and the second part 44 is separated from the adjacent body of ply 22 by a second line of weakening 50. A line of weakening 52 is positioned between outer marginal edge portion 43 and the body of rear ply 22. The lines of weakening 48, 50 and 52 are substantially parallel and are formed in a conventional manner such as by the use of perforations. The lines of weakening permit detachment of the first and second parts of the inner marginal edge portion and the outer marginal edge portion of the ply 22.

The front ply 24 of the outside envelope conforms in outer configuration with rear ply 22 and thus includes a pair of opposing longer top and bottom edges 54 and 56 respectively and a pair of shorter opposing inner and outer edges 58 and 60 respectively. Adjacent to inner edge 58 is an inner marginal edge portion including a first part 62 and a second part 64 conforming in position and configuration to parts 42 and 44 of back ply 22. An outer marginal edge portion 66 is adjacent outer edge 60 and conforms in position and configuration to outer edge portion 43 of ply 22.

First part 62 is separated from second part 64 of the inner marginal edge portion of ply 24 by a line of weakening 68 and second part 64 is separated from the body of ply 24 by line of weakening 70. Similarly, outer edge portion 66 is separated from the body of ply 24 by line of weakening 72. The lines of weakening 68, 70 and 72 align with lines of weakening 48, 50 and 52 when plies 22 and 24 are placed in mating engagement.

It should also be noted that lines of weakening 70 and 50 contain an arcuate intermediate portion 74 and 76 respectively which serve to form mating thumb notches 78 and 80. The notches are helpfull in permitting access to and removal of the return envelope and information ply after the outside envelope has been opened. The lines of weakening can again be formed by utilization of conventional perforations.

The line of interconnection between plies 22 and 24 formed by glue strip 46 is located so that the glue strip 46 extends around the periphery of the body portion of plies 22 and 24 with the exception of the section adjacent inner edges 38 and 58 where it is located on the second parts 44 and 64 respectively of plies 22 and 24.

Back ply 26 and forward ply 28 of the return envelope are also rectangular in configuration although of smaller size so that they can fit within the outside envelope. In accordance therewith, back ply 26 has opposing longer top and bottom edges 82 and 84 and shorter opposing inner and outer edges 86 and 88. Adjacent inner edge 86 is an inner marginal edge portion 90 which is separated from the body of back ply 26 by line of weakening 92.

Back ply 26 is connected to forward ply 28 of the return envelope by line of interconnection 98 which extends along three edges leaving the fourth side open for access to the interior of the return envelope. Line 98 can be formed of conventional adhesive or glue. It extends adjacent to edge 82 on the top adjacent to line of weakening 92 at the inner side and adjacent to edge 84 at the bottom.

Forward ply 28 includes a corresponding top edge 100 and opposing bottom edge 102. It also has opposing shorter edges, inner edge 104 and outer edge 106. An inner marginal edge portion 107 is formed by line of weakening 109 adjacent to inner edge 104.

An outer marginal edge portion 110 is also provided adjacent to outer edge 106. It includes a first part 112 a second part 114 and a third part 115. Part 112 is separated from part 114 by a line of weakening 116 and part 114 is separated from the third part 115 by a line of weakening 117. Part 115 is separated from the body portion of ply 28 by line of weakening or score line 118.

When the back ply 26 and forward ply 28 are interengaged, line of connection 98 seals the envelope on three sides. The outer side remains open. In this condition it is positioned within the outside envelope.

On the side of forward ply 28 facing back ply 26 is a strip of covered adhesive 119. The adhesive 119 is covered by a conventional removable protective strip 121. The adhesive 119 is located on the third part 115 of the outer marginal edge portion 110 of the forward ply and is in position to engage the back ply 26 when third part 115 is folded about line of weakening 118 so as to seal the return envelope.

All of the lines of weakening on forward ply 28 again can be formed by use of conventional perforations.

Information ply 30 has substantially the same configuration as ply 28 except for the absence of a part equivalent to part 112. It includes a pair of opposing longer top and bottom edges 120 and 122 respectively and a pair of opposing shorter inner and outer edges 124 and 126 respectively. An inner marginal edge portion 128 is formed adjacent inner edge 124 by means of a line of weakening 130 on information ply 30. *To connect information ply 30 to ply 28, inner marginal edge portion 128 is adhered to inner marginal edge portion 107 along a glue line 129, shown in FIGS. 2A and 3A.*

Similarly, a line of weakening 132 serves to form outer marginal edge portion 134 adjacent to outer edge 126 of ply 30. The lines of weakening 130 and 132 can again be formed conventionally by perforations. A line of interconnection is formed by adhesive or glue 136 on outer marginal edge portion 134 of ply 30 in position to engage second part 114 of outer marginal edge portion 110 of forward ply 28.

For inventory purposes, an optional additional invention sheet 32 can be applied to the assembly. It is formed of the same general size and configuration as the plies of the envelope assembly. Thus, it would include a pair of opposing top and bottom longer edges 138 and 140 respectively and a pair of opposing shorter inner and outer edges 142 and 144 respectively. Adjacent inner edge 142 is an inner marginal edge portion 146 formed by a line of weakening 148. Similarly, an outer marginal edge portion 150 is formed by a line of weakening 152. The lines of weakening can be formed by a conventional procedure such as by making perforations in the sheet.

Figures 2, 3:
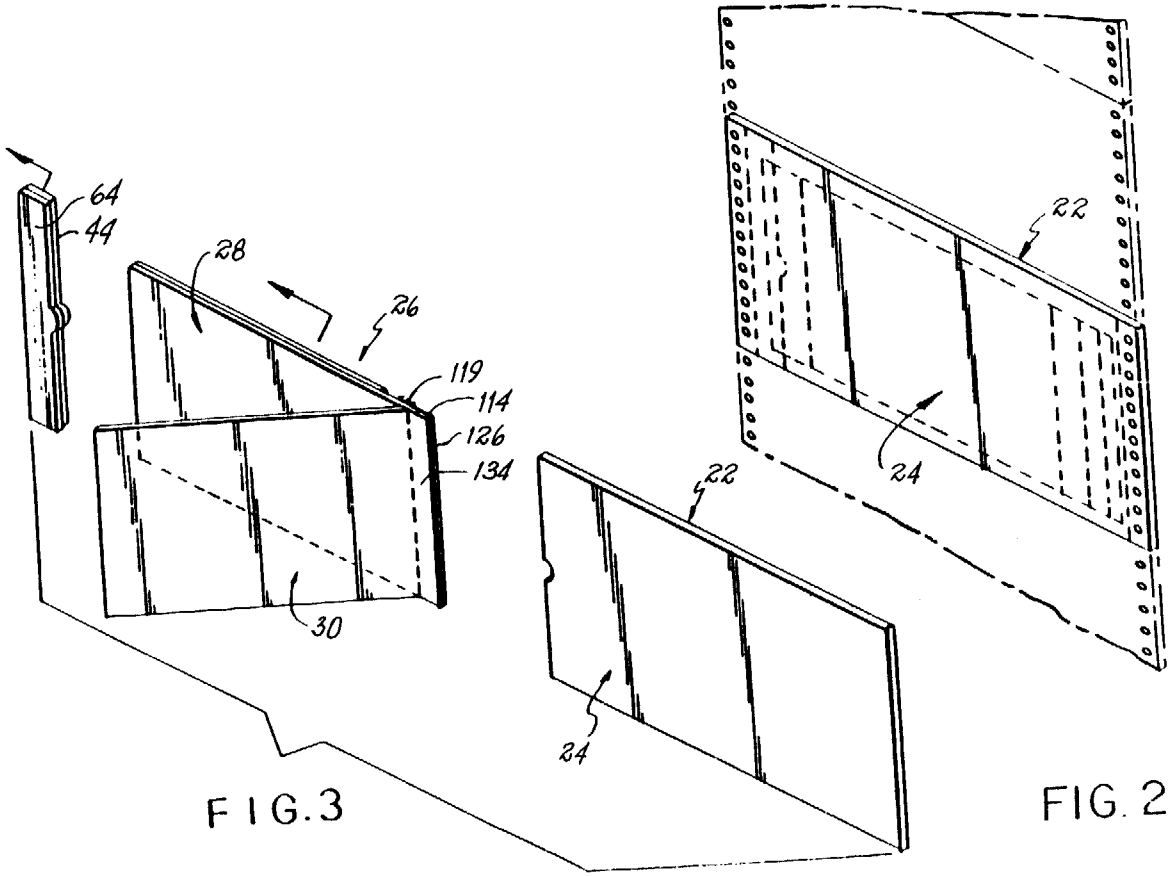
FIG. 2 is a perspective view of the envelope assembly.
FIG. 3 is a perspective view of the assembly, *excluding inventory ply 32* with the outside envelope having been opened and the return envelope and information ploy therein having been detached and partially removed therefrom.
Figure 2A:
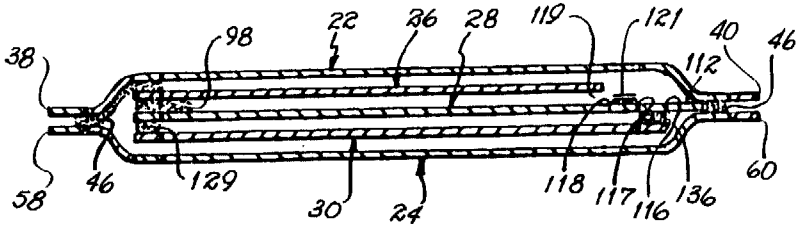
FIG. 2A is a *widthwise* sectional [end] view [thereof] *looking down in the direction of top edge 34 in FIG. 1, excluding inventory ply 32; excluding inventory ply 32;*

To form the assembly 20 as shown in FIG. 2 and 2A, the back and forward plies of the return envelope are coupled by adhesive connecting line 98 on three sides. Information ply 30 is attached to the return envelope by adhesive 136 holding outer marginal edge portions 134 and 114 together. This combination of the return envelope and the information ply is held within the outside envelope by the peripheral adhesive connecting line 46. The envelope and information ply combination is held at the two transverse edges, that is the inner and outer edges. At the inner edge, inner edge portions 128, 107 and 90 are held by the adhesive line 46 which at the same time holds the inner side of the outside envelope rear and front plies together.

At the outer edge, outer marginal edge portion 112 of return envelope front, ply 28 is adhesively held by the outer edge of line 46 as it acts in connecting the outer edge portions of the rear and front plies of the outside envelope together. By retaining the plies within the outside envelope in fixed position, registration is obtained for purposes of applying indicia and other information to any of the plies of the assembly. This would include the rear and front plies of the outside envelope, the back and forward plies of the return envelope, and the information ply.

Figure 3A:
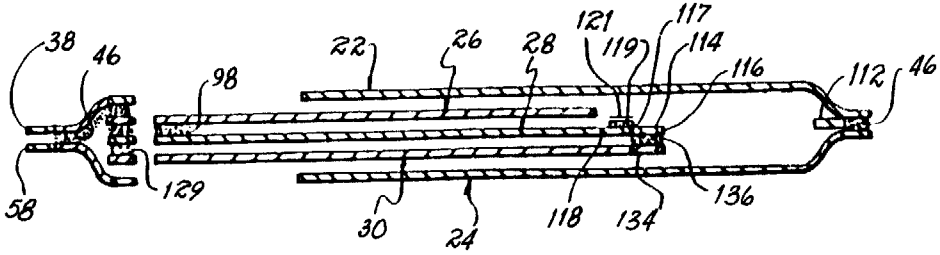
FIG. 3A is a *widthwise* sectional [end] view [thereof] *similar to FIG. 2A, with the outside envelope having been opened and the return envelope and information ply therein having been detached and partially removed therefrom;*

The inventory ply 32 is adhesively mounted or staked to the inner and outer edges as well with the appropriate means holding inner marginal edge portion 146 to edge portion 62 of ply 24 and outer marginal edge portion 150 to outer marginal edge portion 66 of ply 24. The inventory ply 32 can easily be removed by detaching the central portion of ply 32 along lines of weakening 148 and 152. Alternative to the use of adhesive the inner marginal edge portions 42, 62 and the outer marginal edge portions 43, 66 of the outside envelope can also be staked together. Before mailing, generally the first part of the inner marginal edge portions 42, 62 and the outer marginal edge portions 43, 66 of the outside envelope are removed by detaching along the lines of weakening 48, 68 and 52, 72 respectively. This does not affect the sealed integrity of the outside envelope. At that point, envelope assembly 20 with inventory control, ply 32, removed is ready for transmittal through the mail to the recipient. When the recipient receives the envelope, the first step is to open the outside envelope. This is easily accomplished as shown in FIGS. 3 and 3A by grasping the inner marginal edge portions of rear ply 22 and front ply 24 of the outside envelope. That includes second part 64 of ply 24 and second part 44 of ply 22 and interconnected thumb notches 78 and 80 and involves tearing away the inner marginal edge portions of the outside envelope by detaching along lines of weakening 50 and 70. This opens the inner end of the outside envelope and provides access to its interior. The thumb notches facilitate grasping of the contents.

Detachment of the inner marginal edge portions of the outside envelope will also detach the inner edge portions of the return envelope and the information ply along mating lines of weakening 92, 108 and 130. This simultaneously frees the inner end of information ply 30 from the inner end of the return envelope. However, the information ply is still retained at its outer end by adhesive engagement between edge portion 134 and edge portion 114 of plies 30 and 28 respectively. Accordingly, the information ply and return envelope will be removed in attached condition from the outside envelope and will not be displaced from one another until the time desired by the recipient.

Removal from the outside element is achieved by applying sufficient force to detach the major portion of ply 28 of the return envelope from the outer marginal edge portion 112. Detachment occurs along the line of weakening 116 on the ply 28. This line of weakening is made weaker than the lines of weakening at the outer marginal edge portion of the forward ply of the return envelope so that detachment occurs along line of weakening 116 and not along lines of weakening 118, 117, or 132. In this manner, the danger of separation of the information ply and return envelope and possible loss of one or the other is avoided.

Figure 4:
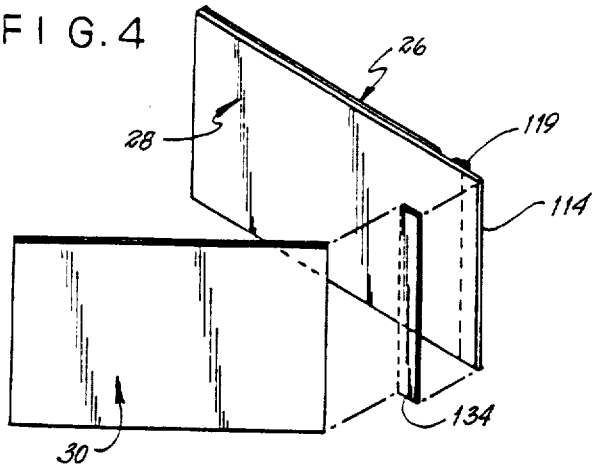
FIG. 4 is a perspective view of the return envelope having been removed from the outside envelope and the information ply having been detached.
Figure 4A:
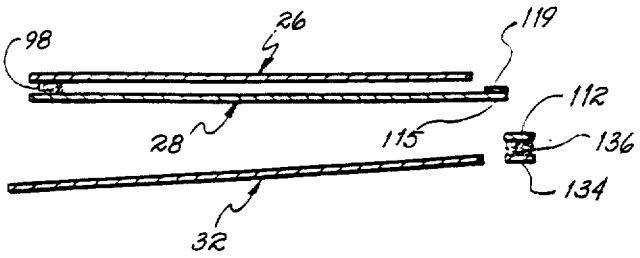
FIG. 4A is a sectional view thereof.

After the detached return envelope including plies 26 and 28 and information ply 30 have been removed from the outside envelope and it is desired to use the return envelope, as observed in FIGS. 4 and 4A outer marginal edge portion 134 and part 114 of outer marginal edge portion 110 are detached along aligned lines of weakening 132 and 117. This frees information ply 30 from interconnection with forward ply 28 of the return envelope.

Figure 5:
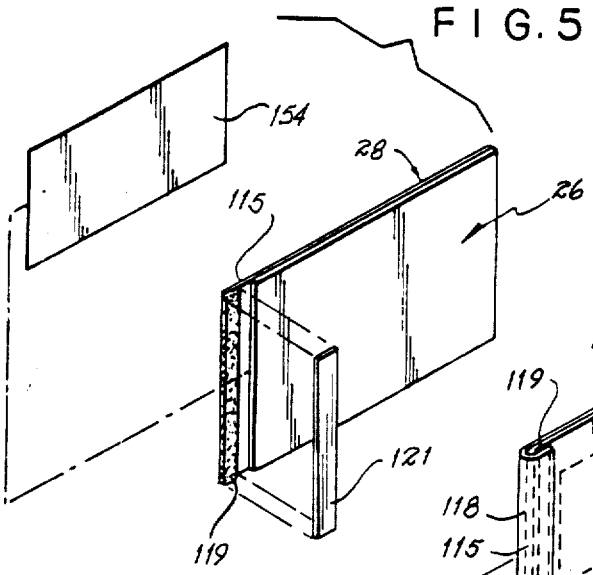
FIG. 5 is a perspective view of the return envelope with the cover for the adhesive strip on the closure flap having been removed and a sheet to be inserted therein.
Figure 6:
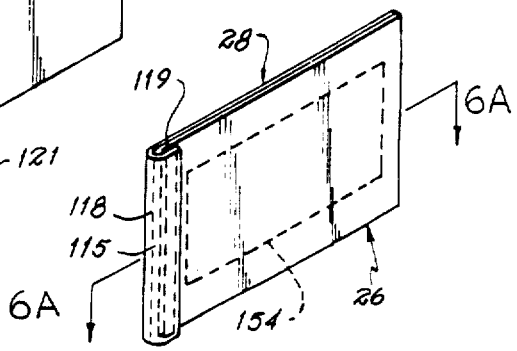
FIG. 6 is a perspective view of the return envelope with the sheet inserted therein and the flap being closed to seal the return envelope.
Figure 5A:
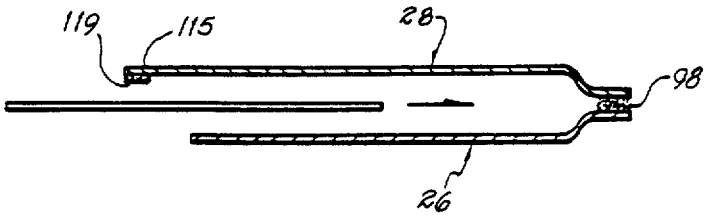
FIG. 5A is a sectional view thereof with the sheet partially inserted.
Figure 6A:
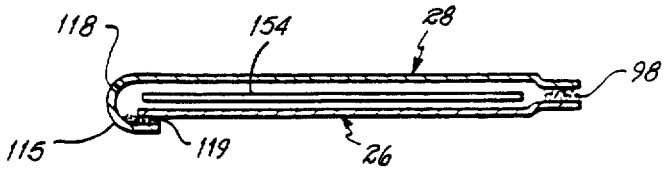
FIG. 6A is a sectional view thereof.

Thereafter as shown in FIGS. 5 and 5A, a desired return sheet 154 is inserted through the open end of the return envelope between plies 26 and 28. Protective strip 121 is then removed from adhesive 119 and the flap formed by the third part 115 of the outer marginal edge portion 110 is bent about line of weakening 118 into overlying relationship with the back ply 26. Adhesive 119 will seal the open end of the return envelope as shown in FIGS. 6 and 6A with the return sheet 154 sealed therein. The return envelope in this form can then be transmitted through the mail in conventional fashion.

Alternatively, the assembly can include one or more information or insert plies with or without a return envelope. For example, a single information ply can be inserted in the outside envelope with a multi-part outer marginal edge portion and an inner marginal edge portion similar to the forward ply of the return envelope of the above discussed embodiment. In this manner, the single ply can be attached and later removed from the outside envelope in a similar fashion. A plurality of information plies with or without a return envelope would be returned similarly to the way that the information ply and return envelope are interconnected in the above embodiment.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. An envelope assembly comprising:

an outside envelope including a rear ply and a front ply and each ply having a body portion and detachable inner and outer marginal edge portions;

[the] *each* inner edge portion including a first part and a second part, the second part being between the first and the body portion of the *respective plies of the* outside envelope;

[said rear and front plies of said outside envelope being interconnected along a line adjacent substantially the entire peripheral edge thereof;]

*a glue line residing adjacent substantially the entire peripheral edge of said rear ply and adapted to adhere to substantially the entire peripheral edge of said front ply thereby to define a line interconnection between said front and rear plies of said outside envelope;* a first line of weakening between the first part and the second part of the inner marginal edge portion of each ply of the outside envelope *thereby to define a rear ply first line of weakening and a front ply first line of weakening;* a second line of weakening between the second part and the body portion of the inner peripheral edge portion of each ply of the outside envelope *thereby to define a rear ply second line of weakening and a front ply second line of weakening;* a third line of weakening between the outer marginal edge portion and the body portion of each ply of the outer envelope *thereby to define a rear ply third line of weakening and a front ply third line of weakening;* a section of the line interconnection being located on [the second part of the inner marginal edge portion so that detachment of the second part] *the second parts of the inner marginal edge portion so that detachment of the second parts* will open one end of the outside envelope to permit access to the interior thereof;

a return envelope smaller than the outside envelope enabling it to be positioned in the outside envelope and including a back, ply and a forward ply each having a body portion and said forward ply having detachable inner and outer marginal edge portion and said back ply having an inner marginal edge portion;

said back and forward plies of said return envelope being interconnected along a line adjacent the peripheral edge thereof and interrupted at the outer edge to provide an access opening;

the outer marginal edge portion of the forward ply including a first part, a second part and a third part, the second part being between the first part and the third part of the forward ply, the third part being between the second part and the body;

a fourth line of weakening between [the] *each* inner edge portion [of the back ply and the forward ply and the] *and each* body portion of the back and forward plies *to define a forward ply fourth line of weakening and a back ply fourth line of weakening for said return envelope;* a fifth line of weakening between the first and second parts of the outer marginal edge of the forward ply of the return envelope;

a sixth line of weakening between the second part of the outer marginal edge portion of the forward ply and the third portion of the forward ply;

a seventh line of weakening between the third part of the outer marginal edge portion of the forward ply and the body portion of the forward ply;

the outer marginal edge portion of the forward ply being held to the outside envelope at the line of interconnection between the rear and front plies of the outside envelope adjacent the outer edge of the outside envelope;

the third part of the outer marginal edge portion of the forward ply adapted to be bent around the seventh line of weakening into overlying position with respect to the back ply [and] *said third part including* attachment means for fastening the folded third part to the back ply;

an information ply smaller than the outside envelope and having a body portion and an inner marginal edge portion connected to the return envelope [at the line of interconnection between the inner marginal edge portion of the rear ply and the inner marginal edge portion of the front ply of the outside envelope] *along a glue line on the inner marginal edge portion of the front ply of the return envelope;* the information ply having an outer marginal edge portion connected to the return envelope at a line of interconnection on the outer marginal edge portion of the forward ply;

the interconnected outside envelope, return envelope and information ply being maintained in registration during formation including placing of indicia thereon;

an eighth line of weakening between the inner marginal edge portion and the body portion of the information ply;

a ninth line of weakening between the outer marginal edge portion and the body portion of the information ply;

the fifth line of weakening *being* weaker than the sixth, seventh and ninth lines of weakening; [*and*] *whereby* detachment of inner marginal edge portions of the rear and front plies of the outside envelope, the inner marginal edge portions of the back and forward plies of the return envelope, and the inner marginal edge portion of the information ply along the second, fourth and eighth lines of weakening provides access to the interior of the outside envelope through the inner end thereof permitting the return envelope and attached information ply to be withdrawn through the open inner end of the outside envelope by detachment along the fifth line of weakening; and separation of the information ply from the return envelope is accomplished by removing the outer marginal edge portion of the information ply and the second part of the outer marginal edge portion of the forward ply of the return envelope along the sixth and ninth lines of weakening which also enables the third part of the outer marginal edge portion to be bent about the seventh line of weakening to close the return envelope.

2. The invention in accordance with claim 1 wherein a detachable inventory ply is attached to the side of the front of the outside envelope distal from the rear ply of the outside envelope, the inventory ply being substantially the same size as the outside envelope [and being detachable without interfering with the integrity of the remainder of the envelope assembly] *whereby detachment of said inventory ply does not disrupt said line interconnection.*

3. The invention in accordance with claim 1 wherein a mating line of weakening is provided in the rear and front plies of the outside envelope adjacent to and intersecting with the second parts of the inner marginal edge portions of each ply to facilitate grasping and removal of the inner marginal edge portions of the rear and front plies of the outside envelope to facilitate opening of the outer envelope and grasping of the return envelope and information ply located therein.

4. The invention in accordance with claim 3 wherein the lines of weakening in the rear and front plies of the outside envelope adjacent to the inner marginal edge portions thereof are arcuate in shape and formed by perforations.

5. The invention in accordance with claim 1 wherein a serially arranged plurality of detachable envelopes are interconnected along lines of weakening at the top and bottom of each envelope assembly.

6. The invention in accordance with claim 1 wherein the outer marginal edge portion of the forward ply of the return envelope is larger and extends further outward than the outer marginal edge portions of the back ply of the return envelope and the information ply, [and] the outer marginal edge portion of the forward ply extending outwardly beyond the outer marginal edge portions of the back ply and the information ply *and* into communication with the line of connection between the rear ply and the front ply of the outside envelope so as to be connected thereto.

7. The invention in accordance with claim 1 wherein the attachment means between the back and forward plies of the return envelope for closing the return envelope after removal from the outside envelope includes a strip of adhesive on the third part of the outer marginal edge of the forward ply covered by a removable protective strip so that folding of the third part of the outer marginal edge of the forward ply after removal of the protective strip will bring the line of adhesive into engagement with the back ply whereupon the return envelope will be sealed.

*8. An envelope assembly comprising:*

*an outside envelope including a rear ply and a front ply and each ply having a body portion and detachable inner and outer marginal edge portions;*

*each inner edge portion including a first part and a second part, the second part being between the first and the body portion of the respective plies of the outside envelope;*

*a glue line residing adjacent substantially the entire peripheral edge of said rear ply and adapted to adhere to substantially the entire peripheral edge of said front ply thereby to define a line interconnection between said front and rear plies of said outside envelope;*

*a first line of weakening between the first part and the second part of the inner marginal edge portion of each ply of the outside envelope thereby to define a rear ply first line of weakening and a front ply first line of weakening;*

*a second line of weakening between the second part and the body portion of the inner peripheral edge portion of each ply of the outside envelope thereby to define a rear ply second line of weakening and a front ply second line of weakening;*

*a third line of weakening between the outer marginal edge portion and the body portion of each ply of the outer envelope thereby to define a rear ply third line of weakening and a front ply third line of weakening;*

*a section of the line interconnection being located on the second parts of the inner marginal edge portions so that detachment of the second parts will open one end of the outside envelope to permit access to the interior thereof;*

*a return envelope smaller than the outside envelope enabling it to be positioned in the outside envelope and including a back ply and a formed ply each having a body portion and said forward ply having detachable inner and outer marginal edge portions and said back ply having an inner marginal edge portion;*

*said back and forward plies of said return envelope being interconnected along a line adjacent the peripheral edge thereof and interrupted at the outer edge to provide an access opening;*

*the outer marginal edge portion of the forward ply including an outboard part and an inboard part, the inboard part being between the outboard part and the body;*

*a fourth line of weakening between each inner edge portion and each body portion of the back and forward plies to define a forward ply fourth line of weakening and a back ply fourth line of weakening for said return envelope;*

*an outboard line of weakening between the outboard part of the outer marginal edge portion of the forward ply and the inboard part of the outer marginal edge portion of the forward ply;*

*an inboard line of weakening between the inboard part of the outer marginal edge portion of the forward ply and the body portion of the forward ply;*

*the outboard part of the outer marginal edge portion of the forward ply being held to the outside envelope at the line of interconnection between the rear and front plies of the outside envelope adjacent the outer edge of the outside envelope;*

*the inboard part of the outer marginal edge portion of the forward ply adapted to be bent around the inboard line of weakening into overlying position with respect to the back ply said third part including attachment means for fastening the folded inboard part to the back ply;*

*an information ply smaller than the outside envelope and having a body portion and an inner marginal edge portion connected to the return envelope along a glue line on the inner marginal edge portion of the front ply of the return envelope;*

*the information ply having an outer marginal edge portion connected to the outboard part of the return envelope at a line of interconnection on the outboard part of the outer marginal edge portion of the forward ply;*

*the interconnected outside envelope, return envelope and information ply being maintained in registration during formation including placing of indicia thereon;*

*an eighth line of weakening between the inner marginal edge portion and the body portion of the information ply;*

*a ninth line of weakening between the outer marginal edge portion and the body portion of the information ply;*

*the outboard line of weakening being weaker than the inboard and ninth lines of weakening; whereby*

*detachment of inner marginal edge portions of the rear and front plies of the outside envelope, the inner marginal edge portions of the back and forward plies of the return envelope, and the inner marginal edge portion of the information ply along the second, fourth and eighth lines of weakening (a) provides access to the interior of the outside envelope through the inner end thereof permitting the return envelope and information ply to be withdrawn through the open inner end of the outside envelope by detachment of the return envelope along the outboard line of weakening and (b) permits detachment of the information ply along the ninth line of weakening, whereupon the information ply is separated from the return envelope. the foregoing enabling the inboard part of the outer marginal edge portion to be bent about the inboard line of weakening to close the return envelope.*

*9. An envelope assembly comprising:*

*an outside envelope including a rear ply and a front ply and each ply having a body portion and detachable inner and outer marginal edge portions;*

*each inner edge portion including a first part and a second part, the second part being between the first and the body portion of the respective plies of the outside envelope;*

*a glue line residing adjacent substantially the entire peripheral edge of said rear ply and adapted to adhere to substantially the entire peripheral edge of said front ply thereby to define a line interconnection between said front and rear plies of said outside envelope;*

*a first line of weakening between the first part and the second part of the inner marginal edge portion of each ply of the outside envelope thereby to define a rear ply first line of weakening and a front ply first line of weakening;*

*a second line of weakening between the second part and the body portion of the inner peripheral edge portion of each ply of the outside envelope thereby to define a rear ply second line of weakening and a front ply second line of weakening;*

*a third line of weakening between the outer marginal edge portion and the body portion of each ply of the outer envelope thereby to define a rear ply third line of weakening and a front ply third line of weakening;*

*a section of the line interconnection being located on the second parts of the inner marginal edge portions so that detachment of the second parts will open one end*

*of the outside envelope to permit access to the interior thereof;*

*a return envelope smaller than the outside envelope enabling it to be positioned in the outside envelope and including a back ply and a forward ply each having a body portion and said forward ply having detachable inner and outer marginal edge portions and said back ply having an inner marginal edge portion;*

*said back and forward plies of said return envelope being interconnected along a line adjacent the peripheral edge thereof and interrupted at the outer edge to provide an access opening;*

*the outer marginal edge portion of the forward ply including a first part, a second part and a third part, the second part being between the first part and the third part of the forward ply, the third part being between the second part and the body;*

*a fourth line of weakening between each inner edge portion and each body portion of the back and forward plies to define a forward ply fourth line of weakening and a back ply fourth line of weakening for said return envelope;*

*a fifth line of weakening between the first and second parts of the outer marginal edge of the forward ply of the return envelope;*

*a sixth line of weakening between the second part of the outer marginal edge portion of the forward ply and the third portion of the forward ply;*

*the outer marginal edge portion of the forward ply being held to the outside envelope at the line of interconnection between the rear and front plies of the outside envelope adjacent the outer edge of the outside envelope;*

*the third part of the outer marginal edge portion of the forward ply adapted to be bent around into overlying position with respect to the back ply said third part including attachment means for fastening the folded third part to the back ply;*

*an information ply smaller than the outside envelope and having a body portion and an inner marginal edge portion connected to the return envelope along a glue line on the inner marginal edge portion of the front ply of the return envelope;*

*the information ply having an outer marginal edge portion connected to the return envelope at a line of interconnection on the outer marginal edge portion of the forward ply;*

*the interconnected outside envelope, return envelope and information ply being maintained in registration during formation including placing of indicia thereon;*

*an eighth line of weakening between the inner marginal edge portion and the body portion of the information ply;*

*a ninth line of weakening between the outer marginal edge portion and the body portion of the information ply;*

*the fifth line of weakening being weaker than the sixth and ninth lines of weakening; whereby*

*detachment of inner marginal edge portions of the rear and front plies of the outside envelope, the inner marginal edge portions of the back and forward plies of the return envelope, and the inner marginal edge portion of the information ply along the second, fourth and eighth lines of weakening provides access to the interior of the outside envelope through the inner end thereof permitting the return envelope and attached information ply to be withdrawn through the open inner end of the outside envelope by separating the first and second parts of the outer marginal edge of the forward ply of the return envelope along the fifth line of weakening, and separation of the information ply from the return envelope is accomplished by removing the outer marginal edge portion of the information ply and the second part of the outer marginal edge portion of the forward ply of the return envelope along the ninth and sixth lines of weakening which also enables the third part of the outer marginal edge portion to be bent to close the return envelope.*

*10. An envelope assembly comprising:*

*an outside envelope including a rear ply and a front ply and each ply having a body portion and detachable inner and outer marginal edge portions;*

*each inner edge portion including a first part and a second part, the second part being between the first and the body portion of the respective plies of the outside envelope;*

*a glue line residing adjacent the inner and outer marginal edge portions of said rear ply and adapted to adhere to the inner and outer marginal edge portions of said front ply thereby to define at least inner and outer lines of interconnection between said front and rear plies of said outside envelope;*

*a first line of weakening between the first part and the second part of the inner marginal edge portion of each ply of the outside envelope thereby to define a rear ply first line of weakening and a front ply first line of weakening;*

*a second line of weakening between the second part and the body portion of the inner peripheral edge portion of each ply of the outside envelope thereby to define a rear ply second line of weakening and a front ply second line of weakening;*

*a third line of weakening between the outer marginal edge portion and the body portion of each ply of the outer envelope thereby to define a rear ply third line of weakening and a front ply third line of weakening;*

*a section of the inner line of interconnection being located on the second parts of the inner marginal edge portions so that detachment of the second parts will open one end of the outside envelope to permit access to the interior thereof;*

*a return envelope smaller than the outside envelope enabling it to be positioned in the outside envelope and including a back ply and a forward ply each having a body portion and said forward ply having detachable inner and outer marginal edge portions and said back ply having an inner marginal edge portion;*

*said back and forward plies of said return envelope being interconnected along a line adjacent the peripheral edge thereof and interrupted at the outer edge to provide an access opening;*

*the outer marginal edge portion of the forward ply including a first part, a second part and a third part, the second part being between the first part and the third part of the forward ply, the third part being between the second part and the body;* a fourth line of weakening between each inner edge portion and each body portion of the back and forward plies to define a forward ply fourth line of weakening and a back ply fourth line of weakening for said return envelope;

*a fifth line of weakening between the first and second parts of the outer marginal edge of the forward ply of the return envelope;*

*a sixth line of weakening between the second part of the outer marginal edge portion of the forward ply and the third portion of the forward ply;* a seventh line of weakening between the third part of the outer marginal edge portion of the forward ply and the body portion of the forward ply;

*the outer marginal edge portion of the forward ply being held to the outside envelope at the outer line of interconnection between the rear and front plies of the outside envelope adjacent the outer edge of the outside envelope;*

*the third part of the outer marginal edge portion of the forward ply adapted to be bent around the seventh line of weakening into overlying position with respect to the back ply said third part including attachment means for fastening the folded third part to the back ply;*

*an information ply smaller than the outside envelope and having a body portion and an inner marginal edge portion connected to the return envelope along a glue line on the inner marginal edge portion of the front ply of the return envelope;*

*the information ply having an outer marginal edge portion connected to the return envelope at a line of interconnection on the outer marginal edge portion of the forward ply;*

*the interconnected outside envelope, return envelope and information ply being maintained in registration during formation including placing of indicia thereon;*

*an eighth line of weakening between the inner marginal edge portion and the body portion of the information ply;*

*a ninth line of weakening between the outer marginal edge portion and the body portion of the information ply;*

*the fifth line of weakening being weaker than the sixth, seventh and ninth lines of weakening; whereby*

*detachment of inner marginal edge portions of the rear and front plies of the outside envelope, the inner marginal edge portions of the back and forward plies of the return envelope, and the inner marginal edge portion of the information ply along the second, fourth and eighth lines of weakening provides access to the interior of the outside envelope through the inner end thereof permitting the return envelope and attached information ply to be withdrawn through the open inner end of the outside envelope by detachment along the fifth line of weakening, and separation of the information ply from the return envelope is accomplished by removing the outer marginal edge portion of the information ply and the second part of the outer marginal edge portion of the forward ply of the return envelope along the sixth and ninth lines of weakening which also enables the third part of the outer marginal edge portion to be bent about the seventh line of weakening to close the return envelope.*

*11. An envelope assembly comprising:*

*an outside envelope including a rear ply and a front ply and each ply having a body portion and detachable inner and outer marginal edge portions;*

*each inner edge portion including a first part and a second part, the second part being between the first and the body portion of the respective plies of the outside envelope;*

*a glue line residing adjacent substantially the entire peripheral edge of said rear ply and adapted to adhere to substantially the entire peripheral edge of said front ply thereby to define a line interconnection between said front and rear plies of said outside envelope;*

*a first line of weakening between the first part and the second part of the inner marginal edge portion of each ply of the outside envelope thereby to define a rear ply first line of weakening and a front ply first line of weakening;*

*a second line of weakening between the second part and the body portion of the inner peripheral edge portion of each ply of the outside envelope thereby to define a rear ply second line of weakening and a front ply second line of weakening;*

*a third line of weakening between the outer marginal edge portion and the body portion of each ply of the outer envelope thereby to define a rear ply third line of weakening and a front ply third line of weakening;*

*a section of the line interconnection being located on the second parts of the inner marginal edge portions so that detachment of the second parts will open one end of the outside envelope to permit access to the interior thereof;*

*a return envelope smaller than the outside envelope enabling it to be positioned in the outside envelope and including a back ply and a forward ply each having a body portion and said forward ply having detachable inner and outer marginal edge portions and said back ply having an inner marginal edge portion;*

*said back and forward plies of said return envelope being interconnected along a line adjacent the peripheral edge thereof and interrupted at the outer edge to provide an access opening;*

*the outer marginal edge portion of the forward ply including an outboard part and an inboard part, the inboard part being between the outboard part and the body;*

*a fourth line of weakening between each inner edge portion and each body portion of the back and forward plies to define a forward ply fourth line of weakening and a back ply fourth line of weakening for said return envelope;*

*a fifth line of weakening between the outboard part of the outer marginal edge portion of the forward ply and the inboard part of the outer marginal edge portion of the forward ply;*

*the outbaord part of the outer marginal edge portion of the forward ply being held to the outside envelope at the line of interconnection between the rear and front plies of the outside envelope adjacent the outer edge of the outside envelope;*

*the inboard part of the outer marginal edge portion of the forward ply adapted to be bent into overlying position with respect to the back ply said third part including attachment means for fastening the folded inboard part to the back ply;*

*an information ply smaller than the outside envelope and having a body portion and an inner marginal edge portion connected to the return envelope along a glue line on the inner marginal edge portion of the front ply of the return envelope;*

*the information ply having an outer marginal edge portion connected to the outboard part of the return envelope at a line of interconnection on the outboard part of the outer marginal edge portion of the forward ply;*

*the interconnected outside envelope, return envelope and information ply being maintained in registration during formation including placing of indicia thereon;*

*an inboard information ply line of weakening between the inner marginal edge portion and the body portion of the information ply;*

*an outboard information ply line of weakening between the outer marginal edge portion and the body portion of the information ply;*

*the fifth line of weakening being weaker than the ninth line of weakening; whereby*

*detachment of inner marginal edge portions of the rear and front plies of the outside envelope, the inner marginal edge portions of the back and forward plies of the return envelope, and the inner marginal edge portion of the information ply along the second, fourth and inboard information ply lines of weakening (a) provides access to the interior of the outside envelope through the inner end thereof permitting the return envelope and information ply to be withdrawn through the open inner end of the outside envelope by detachment of the return envelope along the fifth line of weakening and (b)* permits detachment of the information ply along the outboard information ply line of weakening, whereupon the information ply is separated from the return envelope, the foregoing enabling the inboard part of the outer marginal edge portion to be bent to close the return envelope.

* * * * *

UNITED STATES PATENT AND TRADEMARK OFFICE

CERTIFICATE OF CORRECTION

PATENT NO. : Re. 32,971

DATED : July 4, 1989

INVENTOR(S) : Larry E. Mills and Thomas D. Dove

It is certified that error appears in the above-identified patent and that said Letters Patent is hereby corrected as shown below:

Col. 6, line 4, --before ";" add --, excluding inventory ply 32--

Col. 6, line 7, after ";", delete "excluding inventory ply 32;"

Col. 6, line 12, "ploy" should be --ply--.

Col. 10, line 67, delete the "," after "back".

Col. 13, line 34, "formed" should be --forward--.

Signed and Sealed this

Twenty-first Day of May, 1991

*Attest:*

HARRY F. MANBECK, JR.

*Attesting Officer*

*Commissioner of Patents and Trademarks*